United States Patent
Tengeiji (10) Patent No.: US 10,416,469 B2
(45) Date of Patent: Sep. 17, 2019

(54) IMAGING SCANNER

(71) Applicant: JVC KENWOOD Corporation, Yokohama-shi, Kanagawa (JP)

(72) Inventor: Hideki Tengeiji, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/964,169

(22) Filed: Apr. 27, 2018

(65) Prior Publication Data
US 2019/0064538 A1 Feb. 28, 2019

(30) Foreign Application Priority Data

Aug. 30, 2017 (JP) .................................. 2017-165386

(51) Int. Cl.

| | |
|---|---|
| *G02B 21/36* | (2006.01) |
| *G02B 27/22* | (2018.01) |
| *G01J 3/28* | (2006.01) |
| *G06T 5/50* | (2006.01) |
| *G02B 26/08* | (2006.01) |

(52) U.S. Cl.
CPC ........ *G02B 27/2278* (2013.01); *G01J 3/2803* (2013.01); *G02B 21/367* (2013.01); *G06T 5/50* (2013.01); *G02B 26/0875* (2013.01)

(58) Field of Classification Search
CPC .... G01J 3/2803; G02B 21/367; G02B 21/361
USPC ....................... 358/3.26, 1.18, 505
See application file for complete search history.

(56) References Cited

U.S. PATENT DOCUMENTS

| | | | | |
|---|---|---|---|---|
| 4,755,876 A | * | 7/1988 | Dangler | ............. H04N 1/19505 348/219.1 |
| 2014/0125776 A1 | * | 5/2014 | Damaskinos | ........ G02B 21/365 348/50 |

FOREIGN PATENT DOCUMENTS

JP 2013-238483 A 11/2013

\* cited by examiner

*Primary Examiner* — Jamares Q Washington
(74) *Attorney, Agent, or Firm* — Brundidge & Stanger, P.C.

(57) ABSTRACT

In a virtual slide scanner device, a stage supports a prepared slide in which a sample is fixed. A light source illuminates the prepared slide. An imaging device captures an image of the sample formed by an object lens. An X direction shifting mechanism and a Y direction shifting mechanism shifts a light beam in a two-dimensional direction in a light path from the object lens and the imaging device. A shift control unit controls the X direction shifting mechanism and the Y direction shifting mechanism. A signal processing unit produces a synthesized image by synthesizing shifted pixel images captured by the imaging device by shifting the light beam in the two-dimensional direction using the X direction shifting mechanism and the Y direction shifting mechanism.

2 Claims, 6 Drawing Sheets

| DISPLACED PIXEL POSITION | MANIPULATION CONSTANT k | MANIPULATION CONSTANT l | BACKLASH CONSTANT kb | BACKLASH CONSTANT lb |
|---|---|---|---|---|
| P1 | k1 | l1 | kb1 | lb1 |
| P2 | k2 | l2 | kb2 | lb2 |
| P3 | k3 | l3 | kb3 | lb3 |
| ⋮ | ⋮ | ⋮ | ⋮ | ⋮ |

IMAGING SCANNER

BACKGROUND OF THE INVENTION

1. Field of the Invention

The present invention relates to an imaging technology for imaging a subject with a high resolution.

2. Description of the Related Art

Virtual slide scanners that are designed to scan a prepared slide including a sample mounted on a slide glass to enable observation at a high speed to generate high-resolution digital data have been developed. For example, patent document 1 discloses a virtual slide device capable of correcting colors with a high precision by performing color correction in image data based on standard data determined by the composition distribution in the sample and the spectrum information acquired by the color sensor.

[patent document 1] JP2013-238483

A virtual slide scanner like this generates a very large composite image with a high resolution by capturing images by moving the stage supporting the prepared slide in the X direction and the Y direction and synthesizing the captured images. The stage supporting the prepared slide or the camera is moved relative to each other and the captured images are synthesized. Therefore, it takes time to import captured images. Optically, graphic distortion or a difference in image quality attributable to a difference in the amount of light may be created between the periphery of the image and center of the image. Therefore, a step difference or distortion remains in the ultimately synthesized image. Removal of a step difference or distortion requires, for example, an increase in the number of times that images are captured. As a result, the time required to import captured images is further increased.

SUMMARY OF THE INVENTION

In this background, a purpose of the present invention is to provide an imaging technology capable of generating a high-resolution image of a subject in which distortion is not created.

An imaging device according to an embodiment of the present invention comprises: a stage that supports a subject; a light source that illuminates the subject; an optical system that forms an image of the subject; an imaging device that captures an image of the subject formed by the optical system; a two-dimensional shifting mechanism that shifts a light beam in a two-dimensional direction in a light path from the optical system to the imaging device; a shift control unit that controls the two-dimensional shifting mechanism; and a signal processing unit that produces a synthesized image by synthesizing shifted pixel images captured by the imaging device by shifting the light beam in the two-dimensional direction using the two-dimensional shifting mechanism.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
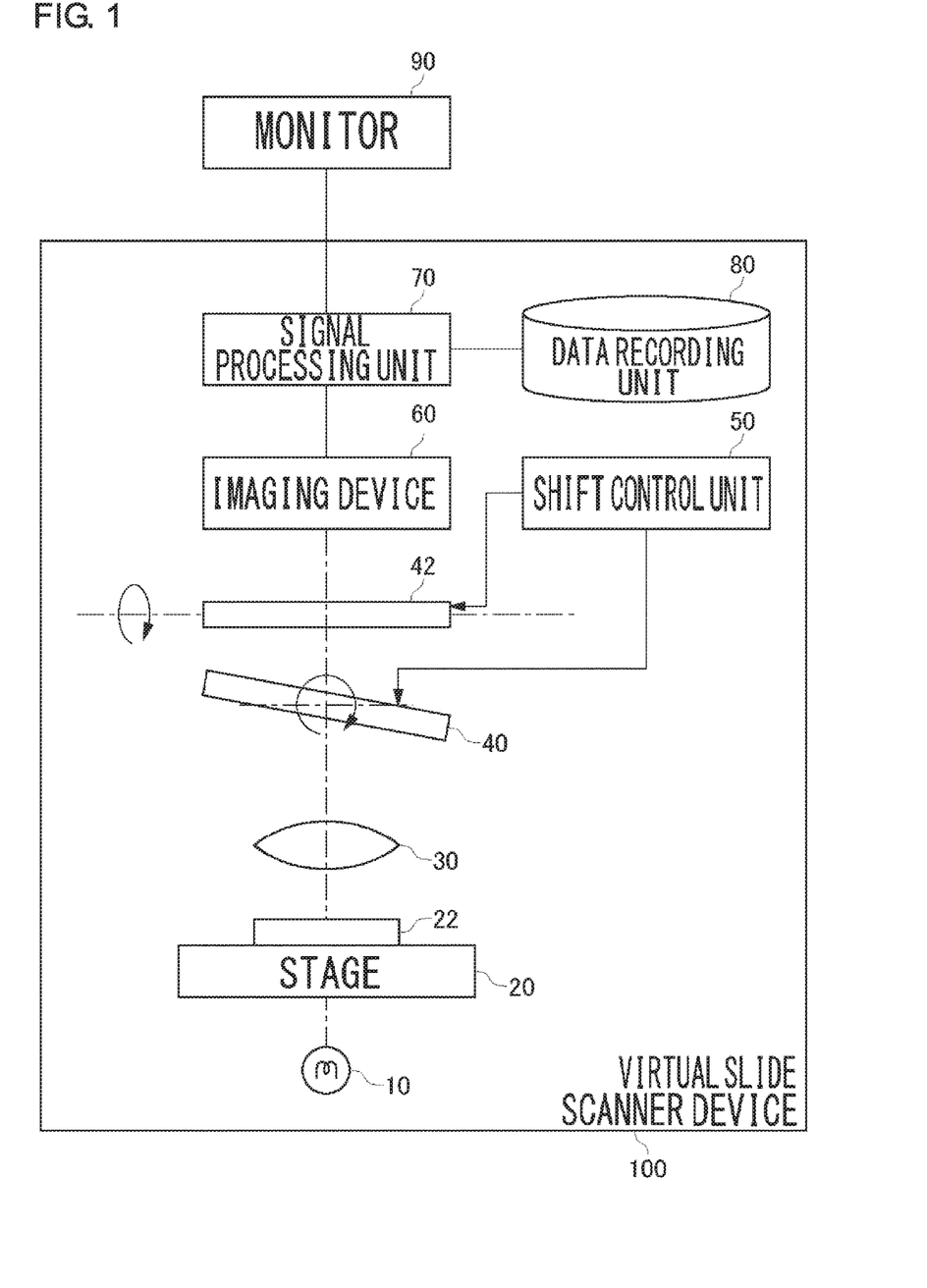
FIG. 1 is a schematic view of a virtual slide scanner device according to an embodiment of the present invention.

FIG. 1 is a schematic view of a virtual slide scanner device 100 according to an embodiment of the present invention.

A prepared slide 22 includes a sample fixed for observation. A stage 20 supports the prepared slide 22. A light source 10 illuminates the prepared slide 22 on the stage 20. An object lens 30 guides light from the prepared slide 22 to form an image on an imaging device 60.

An X direction shifting mechanism 40 and a Y direction shifting mechanism 42 are provided on a light path from the object lens 30 to the imaging device 60 and shift the light beam in the X direction and the Y direction.

In principle, the X direction shifting mechanism 40 sifts the light beam in the X axis direction, and the Y direction shifting mechanism 42 shifts the light beam in the Y axis direction. However, an error is created due to mechanical shift. This is addressed by performing calibration whereby the amount of manipulation of the X direction shifting mechanism 40 and the Y direction shifting mechanism 42 occurring when the light beam is shifted from a reference point to a predetermined shifted pixel position is measured in advance and the result of the measurement is stored in a pixel shift table.

In principle, the light beam may be returned to the reference point by driving the X direction shifting mechanism 40 and the Y direction shifting mechanism 42 in the opposite directions by the same amount of manipulation. A mechanical backlash that occurs prevents the light beam from returning to the reference point. This is addressed in calibration by also measuring the amounts of backlash of the X direction shifting mechanism 40 and the Y direction shifting mechanism 42 and storing the amounts in the pixel shift table. In order to return the light beam to the reference point accurately, the X direction shifting mechanism 40 and the Y direction shifting mechanism 42 are driven in the opposite directions by adding the amount of backlash to the amount of manipulation.

As a result of performing calibration, the amount of manipulation of the X direction shifting mechanism 40, the amount of manipulation of the Y direction shifting mechanism 42, the amount of backlash of the X direction shifting mechanism 40, and the amount of backlash of the Y direction shifting mechanism 42 are stored in the pixel shift table in association with the shifted pixel position.

A shift control unit 50 refers to the amount of manipulation stored in the pixel shift table to drive the X direction shifting mechanism 40 and the Y direction shifting mechanism 42 to shift the light beam from the reference point to a desired shifted pixel position in a two-dimensional direction. Further, the shift control unit 50 adds the amounts of backlash stored in the pixel shift table to the amounts of driving and drives the X direction shifting mechanism 40 and the Y direction shifting mechanism 42 in the opposite directions, thereby returning the light beam to the reference point.

The imaging device 60 captures an image of the sample formed by the object lens 30. A signal processing unit 70 subjects the image captured by the imaging device 60 to a signal process and records the processed image in a data recording unit 80. The signal processing unit 70 produces a high-resolution synthesized image by synthesizing shifted pixel images captured by the imaging device 60 by shifting the light beam in the X direction and the Y direction using the X direction shifting mechanism 40 and the Y direction shifting mechanism 42. The signal processing unit 70 records the high-resolution image in the data recording unit 80. A monitor 90 displays the high-resolution image of the sample synthesized by the signal processing unit 70.

By configuring the amount of pixel shift in the X axis direction and the Y axis direction to be half a pixel, a high-resolution image with the double resolution is produced by the synthesis. Further, the amount of pixel shift of ¼ pixel produces a synthesized high-resolution image with the quadruple resolution in the X axis direction and the Y axis direction by shifting the pixels in such a manner as to divide each pixel into four.

A description will be given of the configuration of the X direction shifting mechanism 40 and the Y direction shifting mechanism 42 and the principle of pixel shift with reference to FIGS. 2 and 3. The X direction shifting mechanism 40 and the Y direction shifting mechanism 42 each includes a plane parallel plate glass 200 and emits light derived from shifting the incident light in the X axis direction and the Y axis direction.

Figure 2:
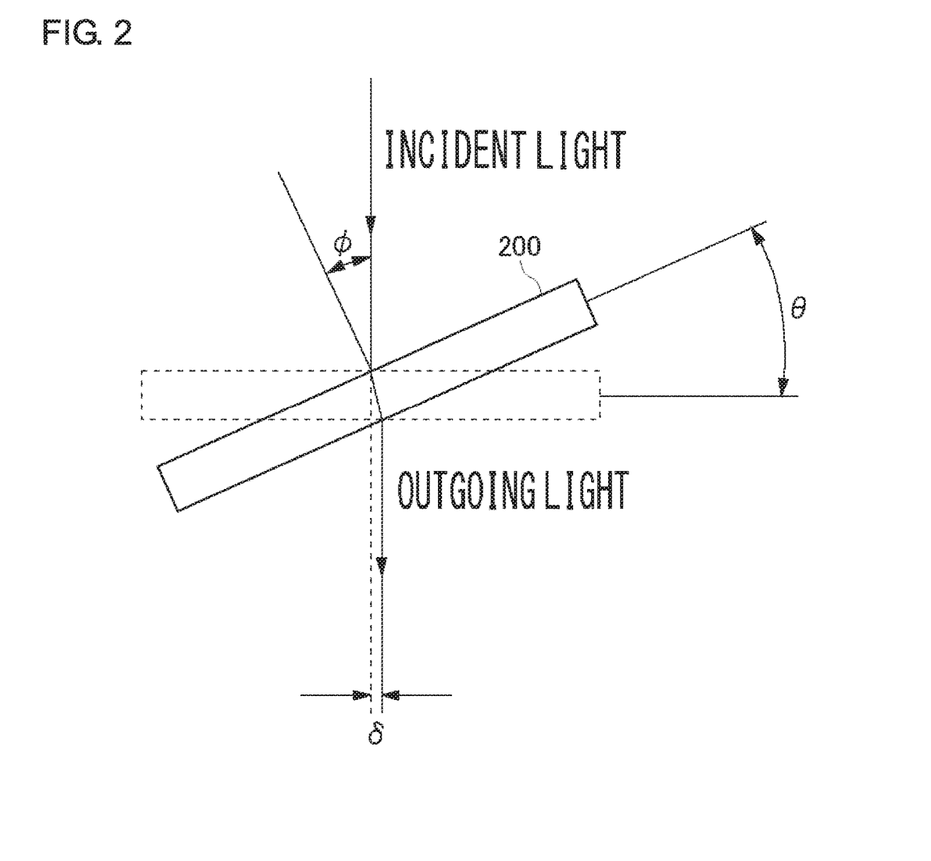
FIG. 2 shows a principle of pixel shift induced by the plane parallel plate glass.

FIG. 2 shows a principle of pixel shift induced by the plane parallel plate glass 200.

If the plane parallel plate glass 200 is perpendicular to the light axis, the light incident perpendicularly on the top surface of the plane parallel plate glass 200 exits perpendicularly from the under surface of the plane parallel plate glass 200 (dotted line). If the plane parallel plate glass 200 is displaced by an angle θ, the outgoing light is parallel to the incident light but is shifted by δ.

Given that the thickness of the plane parallel plate glass 200 in the light axis direction is d and the refractive index Nd, the amount of shift δ of the light beam induced by the plane parallel plate glass 200 is given by (1).

$$\delta = \{1-(1/Nd)*(\cos \varphi/\cos \varphi')\}*d*\sin \varphi \quad (1)$$

where φ is an angle formed by the incident light and the the surface normal of the plane parallel plate glass 200, i.e., an incidence angle, and φ' is an angle formed by the incident light and the surface normal inside the plane parallel plate glass 200.

If the incidence angle is extremely small, cos φ≈1, cos φ'≈1, sin φ≈φ. Further, φ=θ, i.e., the incidence angle and the inclination θ of the plane parallel plate glass 200 are equal. Therefore, the amount of shift δ of the light beam induced by the plane parallel plate glass 200 is given by expression (2) below.

$$\delta = (1-1/Nd)*d*\theta \quad (2)$$

Therefore, a desired shifted pixel image can be formed on the imaging device 60 by appropriately configuring the refractive index Nd, thickness d, and inclination θ of the plane parallel plate glass 200 so that δ is equal to the desired amount of pixel shift.

By using the aforementioned principle of pixel shift induced by the plane parallel plate glass 200, an image in which a given pixel is shifted to a desired two-dimensional position (δx, δy) can be captured by shifting the pixel by δx in the X axis direction using the X direction shifting mechanism 40 and shifting the pixel by δy in the Y axis direction using the Y direction shifting mechanism 42.

Figure 3:
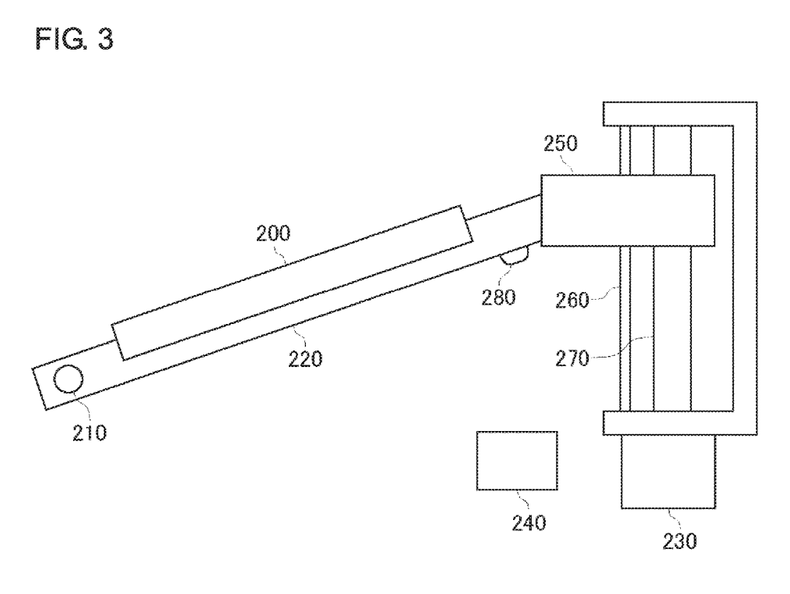
FIG. 3 shows a configuration of the X direction shifting mechanism and the Y direction shifting mechanism of FIG. 1.

FIG. 3 shows a configuration of the X direction shifting mechanism 40 and the Y direction shifting mechanism 42. The X direction shifting mechanism 40 and the Y direction shifting mechanism 42 are identically configured except for the difference between the X axis direction and the Y axis direction. Therefore, the configuration will be described without making any distinction between the X axis direction and the Y axis direction.

The plane parallel plate glass 200 is fixed to a retention frame 220 and the retention frame 220 is rotatable around a rotational shaft 210. A rack 250 is attached to the end of the retention frame 220 opposite to the rotational shaft 210.

The rack 250 is connected to a screw 270. By using a pulse motor 230 to rotate the screw 270 in the forward direction or the reverse direction, the rack 250 can move up and down along the screw 270. The rack 250 and the retention frame 220 are coupled to each other in a U-shaped connection. The upward and downward movement of the rack 250 causes the retention frame 220 to be rotated around the rotational shaft 210. A guide pin 260 is provided to secure parallel movement of the rack 250 along the screw 270.

An optical sensor 280 is provided at the end of the retention frame 220 opposite to the rotational shaft 210. The optical sensor 280 detects an origin by measuring a distance using the light reflected from where the position of origin is set 240 and so is capable of measuring an accurate position.

A description will now be given of mechanical error of the X direction shifting mechanism 40 and the Y direction shifting mechanism 42 with reference to FIGS. 4A, 4B, and 5.

Figure 4A:
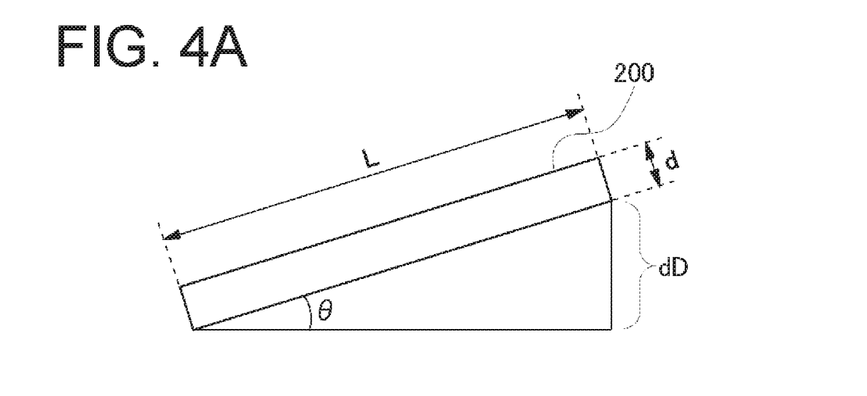
FIGS. 4A and 4B shows a relationship between the inclination of the plane parallel plate glass and the amount of movement of the rack by the pulse motor.
Figure 4B:
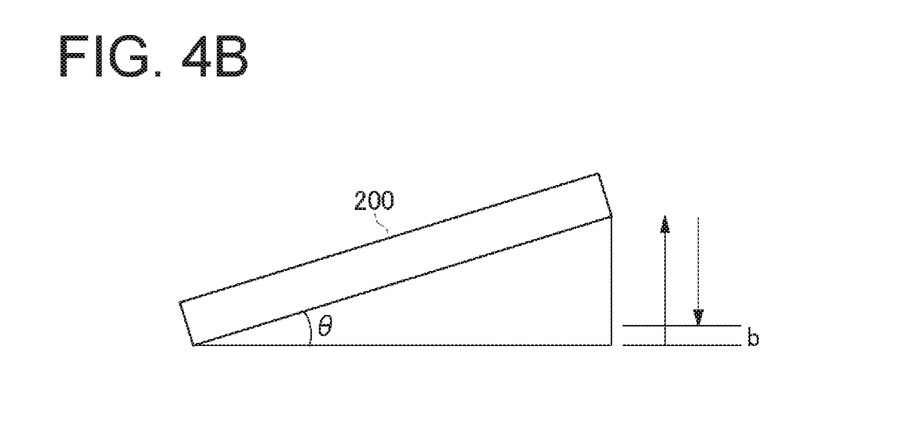

FIGS. 4A and 4B show a relationship between the inclination θ of the plane parallel plate glass 200 and the amount of movement dD of the rack 250 using the pulse motor 230.

As shown in FIG. 4A, given that the plane parallel plate glass 200 is tilted by θ as the pulse motor 230 moves the rack 250 by dD, the inclination θ of the plane parallel plate glass 200 is determined from the amount of movement dD of the rack 250 and the length L of the plane parallel plate glass 200, as given by expression (3) below.

$$\theta = \arcsin(dD/L) \quad (3)$$

Based on expressions (2) and (3), the amount of shift δ of the light beam can be determined from the amount of movement dD of the rack 250, as given by expression (4) below.

$$\delta = (1-1/Nd)*d*\arcsin(dD/L) \quad (4)$$

The amount of movement dD of the rack 250 may be determined based on expression (4) so as to give the desired amount of pixel shift δ. By moving the rack 250 by dDx using the X direction shifting mechanism 40, the light beam is shifted by δx in the X direction. By moving the rack 250 by dDy using the Y direction shifting mechanism 42, the light beam is shifted by δy in the Y direction. Thereby, the pixel is shifted to the desired two-dimensional position (δx, δy).

For pixel shift to the two-dimensional position, a reciprocal movement in the X axis direction and the Y axis direction using the X direction shifting mechanism 40 and the Y direction shifting mechanism 42 occurs. In other words, not only a forward movement but also a backward movement for a return in the negative direction occurs. For this reason, a backlash is created in the shifting mechanisms or the pulse motor, resulting in a failure to restore the accurate position.

FIG. 4B is a diagram to explain a mechanical backlash caused by the X direction shifting mechanism 40 and the Y direction shifting mechanism 42. When the rack 250 is moved upward along the screw 270 using the pulse motor 230 and then returned downward, a mechanical backlash b occurs in the reciprocal movement, preventing the rack 250 from returning to the original position accurately. It is therefore necessary to return the rack 250 to the original position accurately by additionally returning the rack 250 by the backlash b in the reverse movement.

The backlash values of the X direction shifting mechanism 40 and the Y direction shifting mechanism 42 are stored in a table in association with the shifted pixel positions. The amount of movement of the rack 250 for a return to the original position is determined by correcting the amount for the backlash.

Pixel shift is designed for very fine shift such as half a pixel, ¼ pixel, etc. The shift of the light beam using X direction shifting mechanism 40 and the Y direction shifting mechanism 42 is not necessarily in strict alignment with the X axis direction or the Y axis direction due to a mechanical error. Added to this is an error in the thickness d of the plane parallel plate glass 200 induced when the plane parallel plate glass 200 is manufactured. To address this, calibration is performed before shifting pixels to measure the relationship between the shifted pixel position and the amount of manipulation of the X direction shifting mechanism 40 and the Y direction shifting mechanism 42. The result of measurement is stored along with the backlash in the table as a value indicating variation. Accurate pixel shift is achieved by referring to the table when the pixels are actually shifted and determining the amount of manipulation of the X direction shifting mechanism 40 and the Y direction shifting mechanism 42.

A calibration may be performed by imaging a point light source, moving the rack 250 in the X axis direction by the maximum structurally allowed amount of movement (denoted here by Xm), using the X direction shifting mechanism 40, while the Y direction shifting mechanism 42 is maintained at rest, and imaging the point light source again. It will be assumed that the Y coordinate of the point light source is displaced by ycab. The amount of displacement ycab is stored in the table as an installation error value in the Y axis direction. When the pixel is shifted by δx in the X axis direction, the pixel is also shifted in the Y axis direction by −ycan*δx/Xm for correction. Similarly, the rack 250 is moved in the Y axis direction by the maximum structurally allowed amount of movement (denoted here by Ym), using the Y direction shifting mechanism 42, while the X direction shifting mechanism 40 is maintained at rest, and the point light source is imaged accordingly. It will be assumed that the X coordinate of the point light source is displaced by xcan. The amount of displacement xcab is stored in the table as an installation error value in the X axis direction. When the pixel is shifted by δy in the Y axis direction, the pixel is also shifted in the X axis direction by −xcan*δy/Ym for correction. In this way, the pixels are shifted in the two dimension to the accurate positions by allowing for the installation errors.

Figure 5:
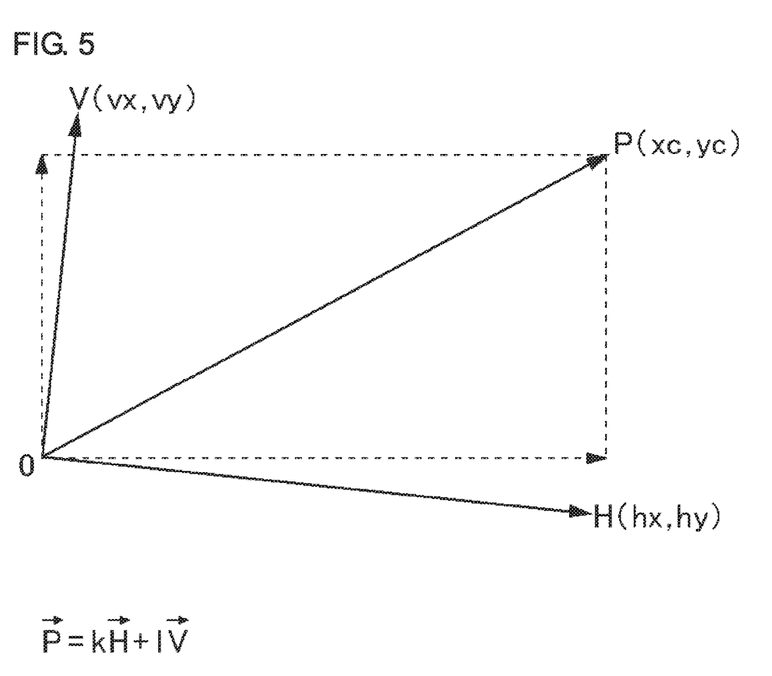
FIG. 5 is a diagram to explain how a shifted pixel position is determined by vector synthesis.

FIG. 5 is a diagram to explain how a shifted pixel position is determined by vector synthesis. It is assumed that a vector P(xc, yc) with reference to a reference point O represents a shifted pixel position at the desired destination. If the light beam is shifted by xc only in the X axis direction using the X direction shifting mechanism 40 and is shifted by yc only in the Y axis direction using the Y direction shifting mechanism 42, the desired objective is achieved. Due to the aforementioned installation errors inherent in the structure, etc., however, the light beam is shifted by the X direction shifting mechanism 40 in the direction indicated by a vector H (hx, hy) and is shifted by the Y direction shifting mechanism 42 in the direction indicated by a vector V (vx, vy).

The vector P (xc, yc) indicating the shifted pixel position is represented by a combination of the vector H (hx, hy) and the vector V (vx, vy) and using constants k, l, as given by expression (5).

$$P=kH+lV \quad (5)$$

The movement from the reference point O to the shifted pixel position (xc, yc) is detected. The amount of manipulation k of the X direction shifting mechanism 40 in the direction indicated by the vector H, and the amount of manipulation l of the Y direction shifting mechanism 42 in the direction indicated by the vector V are determined and are stored in the pixel shift table. Further, the amounts of backlash kb, lb of the X direction shifting mechanism 40 and the Y direction shifting mechanism 42 occurring when the X direction shifting mechanism 40 and the Y direction shifting mechanism 42 are used to return from the shifted pixel position P(xc, yc) to the reference point O are measured. The measured amounts of backlash are stored in the pixel shift table.

The light beam is shifted to several locations in the positive direction and the negative direction using the X direction shifting mechanism 40 and the Y direction shifting mechanism 42 by measurable amounts. The amounts of manipulation k, l of the X direction shifting mechanism 40 and the Y direction shifting mechanism 42 and the amounts of backlash kb, lb associated with the shifted pixel position P are measured. Measurements may be made exhaustively at every point. Alternatively, measurements may be made at representative points and the rest of the amounts may be determined by interpolation. The error occurring when expression (1) is approximated by expression (2) may be reflected in the constant stored in the pixel shift table.

Figure 6:
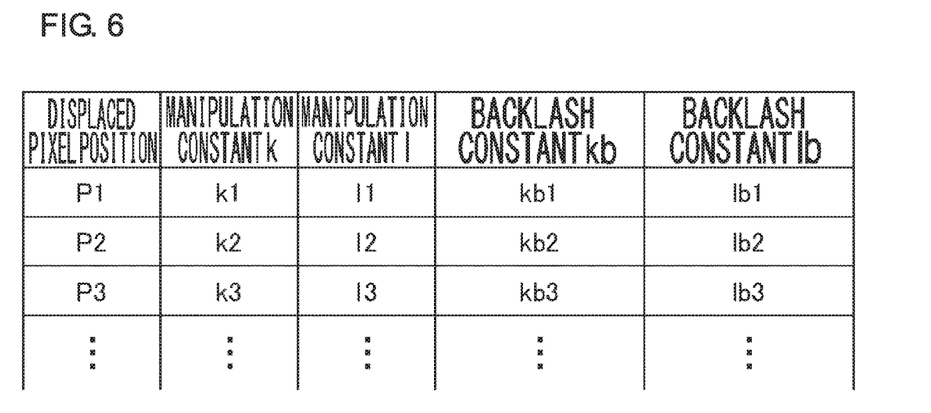
FIG. 6 is a diagram to explain the pixel shift table referred to by the shift control unit of FIG. 1.

FIG. 6 is a diagram to explain the pixel shift table referred to by the shift control unit 50. As shown in the figure, the manipulation constants k, l of the X direction shifting mechanism 40 and the Y direction shifting mechanism 42, and the backlash constants kb, lb, which are measured in the calibration described above are stored in the pixel shift table in association with the shifted pixel positions P. The shift control unit 50 refers to the pixel shift table and controls the X direction shifting mechanism 40 and the Y direction shifting mechanism 42 based on the manipulation constants k, l associated with the desired shifted pixel position P, thereby shifting the light beam from the reference point O to the desired shifted pixel position P. Further, the shift control unit 50 controls the X direction shifting mechanism 40 and the Y direction shifting mechanism 42 for a reverse movement, on the basis of the manipulation constants k, l and the backlash constants kb, lb associated with the desired shifted pixel position P, thereby shifting the light beam from the shifted pixel position P to the reference point O.

As described above, the virtual slide scanner device 100 of the embodiment is capable of instantaneous scanning by capturing a screen of image on two instances by shifting the pixels and eliminating the need for relative movement of the stage and the camera. Since the process is performed within the same screen, accurate focusing is ensured. The process of stitching images is not necessary so that the device is principally free from the impact from image synthesis that accompanies distortion or a difference in image quality such as light amount.

In the related-art high-resolution imaging where a large number of pixel shift patterns is provided, it is difficult to ensure uniform pixel shifts by means of structural design assurance or mechanism adjustment due to variation in the thickness of individual plane parallel plate glasses, precision of assembly of the shifting mechanism, rotational error of the plane parallel plate glass relative to the motor rotation angle, etc., which has made high-resolution imaging a difficult challenge.

According to the virtual slide scanner device 100 of the embodiment, however, the shifting mechanism for optically shifting the light beam while the light axis of the object lens is fixed is used to shift pixels and synthesize a high-resolution image. Since there is no need to move the stage supporting the prepared slide mechanically, no distortion in the image is created due to mechanical shift.

In further accordance with the embodiment, correction data necessary to reproduce the accurate shifted pixel position is produced by calibration and a structural error of the shifting mechanism is compensated accordingly. Therefore, a high-quality high-resolution image can be produced by accurately shifting pixels by half a pixel or with a finer resolution.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. An imaging scanner comprising:
   an optical system that forms an image of a subject;
   an imaging device that captures an image of the subject formed by the optical system;
   a two-dimensional shifting mechanism that shifts a light beam in a two-dimensional direction in a light path from the optical system to the imaging device;
   a shift control unit that controls the two-dimensional shifting mechanism;
   a pixel shift table that stores an amount of manipulation with mechanical error of the two-dimensional shifting mechanism for shifting the light beam to a predetermined shifted pixel position, the amount of manipulation being beforehand measured for the predetermined shifted pixel position,
   wherein the shift control unit refers to the pixel shift table and shifts the light beam from a reference point to a desired shifted pixel position by driving the two-dimensional shifting mechanism by the amount of manipulation associated with the shifted pixel position; and
   a signal processing unit that produces a synthesized image by synthesizing an image before the pixel shift and an image after the pixel shift.

2. An imaging scanner comprising:
   an optical system that forms an image of a subject;
   an imaging device that captures an image of the subject formed by the optical system;
   a two-dimensional shifting mechanism that shifts a light beam in a two-dimensional direction in a light path from the optical system to the imaging device;
   a shift control unit that controls the two-dimensional shifting mechanism;
   a pixel shift table that stores an amount of manipulation and an amount of mechanical backlash of the two-dimensional shifting mechanism for shifting the light beam to a predetermined shifted pixel position, in association with the predetermined shifted pixel position,
   wherein the shift control unit refers to the pixel shift table and shift the light beam from a reference point to a desired shifted pixel position by driving the two-dimensional shifting mechanism by the amount of manipulation associated with the shifted pixel position; and
   a signal processing unit that produces a synthesized image by synthesizing a first image before the pixel shift and a second image after the pixel shift,
   wherein the shift control unit refers to the pixel shift table and returns the light beam from the desired shifted pixel position to the reference point by driving the two-dimensional shifting mechanism in an opposite direction by adding the amount of backlash associated with the shifted pixel position to the amount of manipulation.

\* \* \* \* \*